(12) United States Patent
Rosa

(10) Patent No.: US 6,598,502 B1
(45) Date of Patent: Jul. 29, 2003

(54) MULTI-SWIVEL CONNECTOR FOR A FLUID OPERATED TOOL

(75) Inventor: Peter A. Rosa, Madison, CT (US)

(73) Assignee: Titan Technologies International, Inc., Madison, CT (US)

( * ) Notice: Subject to any disclaimer, the term of this patent is extended or adjusted under 35 U.S.C. 154(b) by 0 days.

(21) Appl. No.: 10/058,671

(22) Filed: Jan. 28, 2002

(51) Int. Cl.⁷ .............................. B25B 13/46; F16L 27/00
(52) U.S. Cl. ...................................... 81/57.39; 137/580
(58) Field of Search ........................ 81/57.39; 137/580; 285/147.1

(56) References Cited

U.S. PATENT DOCUMENTS

| | | | |
|---|---|---|---|
| 5,311,796 A | | 5/1994 | Junkers |
| 5,918,424 A | * | 7/1999 | Rice .......................... 137/580 |
| 6,039,068 A | * | 3/2000 | Tessier et al. .............. 137/580 |
| 6,089,265 A | | 7/2000 | Wang |
| 6,406,065 B1 | * | 6/2002 | Ott et al. .................... 137/580 |

* cited by examiner

Primary Examiner—D. S. Meislin
(74) Attorney, Agent, or Firm—Bachman & LaPoint, P.C.

(57) ABSTRACT

The present invention relates to a multi-swivel connector for a fluid operated power tool. The connector has a post with an axis, a swivel member having an axis perpendicular to the axis of the post, a mechanism for limiting rotation of the swivel member about said post axis to an arc less than 360 degrees, and a fitting member mounted to the swivel member. The fitting member is tiltable about the axis of the swivel member through at least a 90 degree arc and rotatable with the swivel member about the axis of the post.

23 Claims, 5 Drawing Sheets

MULTI-SWIVEL CONNECTOR FOR A FLUID OPERATED TOOL

BACKGROUND OF THE INVENTION

The present invention relates to a multi-swivel connector for connecting a fluid operated tool to a source of fluid, for example to hoses extending from a fluid source.

Swivel connectors of the above mentioned general type are known in the art. One of such connectors is disclosed in U.S. Pat. No. 5,311,796. Another such connector is shown in U.S. Pat. No. 6,089,265. One of the problems associated with these swivels is that their freedom of movement can result in safety problems, such as pinch points, which have the potential for injury and hose kinking. In addition, the freedom of movement makes it difficult for the operator to attach hoses to the quick connects or to make repairs to the swivels or connectors. In extreme cases, where users of the power tools pick them up in non-recommended ways, safety problems can arise as a result of the ability of the connectors to rotate 360 degrees or greater or great effort is required to stabilize the swivel to initiate repair, replacement of the swivel or to change a connection or even attach the connections.

SUMMARY OF THE INVENTION

Accordingly, it is an object of the present invention to provide an improved multi-swivel connector for a fluid operated tool.

It is a further object of the present invention to provide a multi-swivel connector as above which is incapable of rotating 360 degrees, thus providing enhanced safety.

The foregoing objects are attained by the multi-swivel connector of the present invention.

In accordance with the present invention, a multi-swivel connector for connecting a fluid operated tool to fluid source is provided. The multi-swivel connector broadly comprises a post having an axis, swivel means having an axis extending perpendicular to the axis of the post, means for limiting rotation of the swivel means to an arc or range of motion less than 360 degrees, fitting means attached to the swivel means, which fitting means is tiltable around the axis of the swivel means over a range of at least 90 degrees and is rotatable around the axis of the post.

Other details of the multi-swivel connector of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
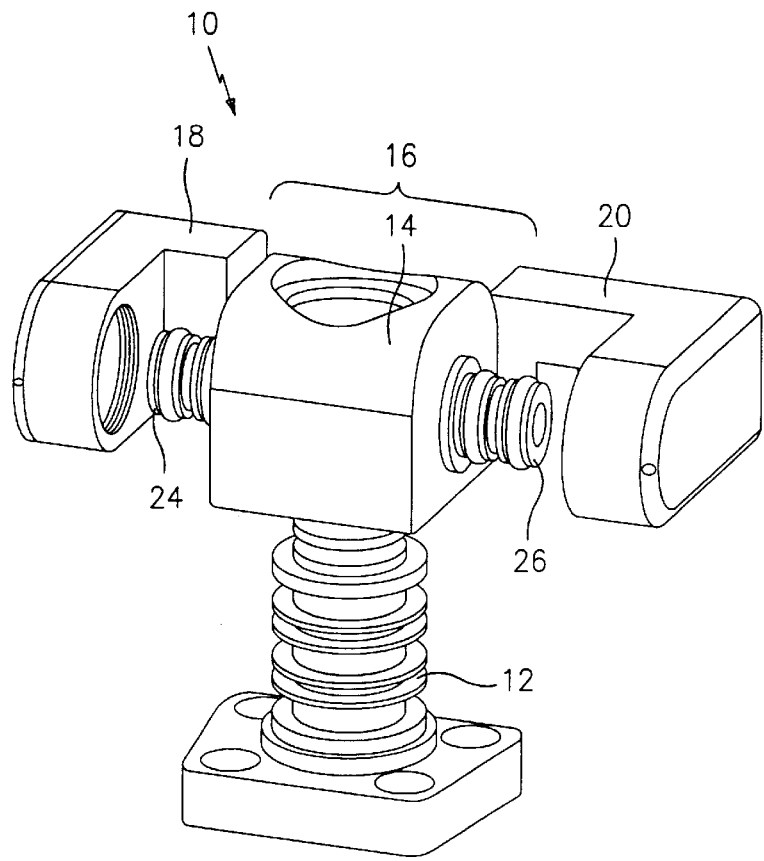
FIG. 1 is an exploded view of a multi-swivel connector in accordance with the present invention.

FIG. 1 illustrates the components which make up the multi-swivel connector 10 of the present invention. The connector 10 includes a post 12, a swivel member 14 which fits over the post 12, and a fitting member 16 formed by first and second fitting arms 18 and 20. The swivel member 14 may be rotated about a longitudinal axis 22 of the post 12 through a range of motion of less than 360 degrees for safety reasons. The swivel member 14 has first and second arms 24 and 26. The fitting member 16 is attached to the arms 24 and 26 so that the fitting member 16 may tilt relative to the swivel member 14 through a range of motion of at least 90 degrees and preferably through a range of motion of substantially 180 degrees, about an axis 23 which is perpendicular to the axis 22.

Figure 2:
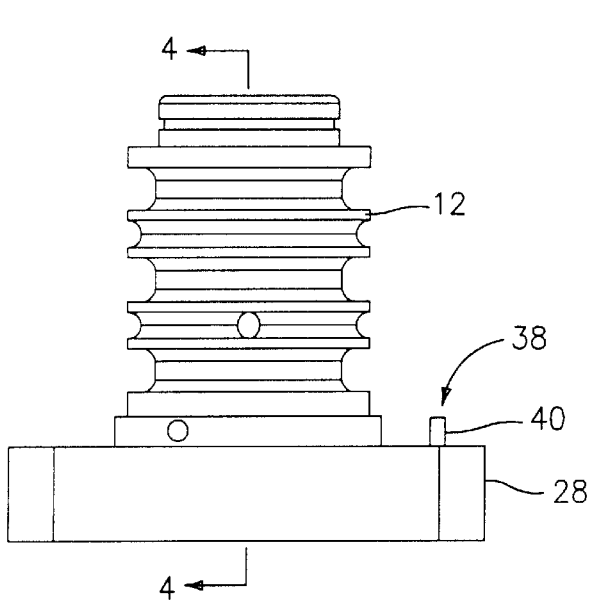
FIG. 2 is a front view of a post used in the multi-swivel connector.
Figure 3:
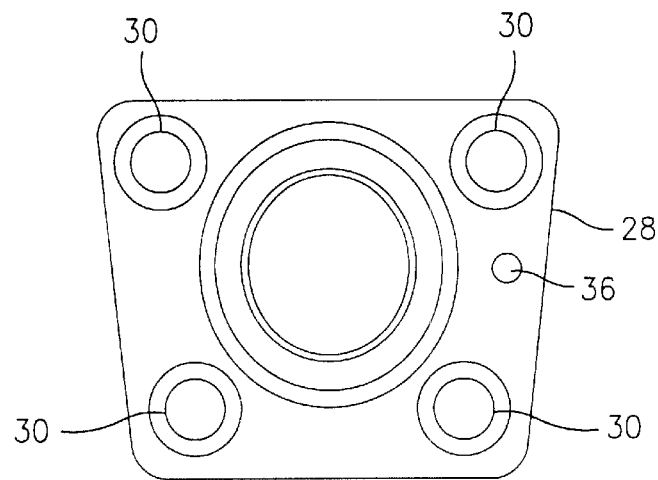
FIG. 3 is a top view of the post of FIG. 2.

As can be seen from FIGS. 2 and 3, the post 12 has a base member 28, which is preferably trapezoidal in shape. The base member 28 is integrally formed with the post 12; however, if desired, the base member 28 may be configured to be separable from the post 12. The base member 28 and the post 12 are preferably formed from a metallic material, such as aluminum or an aluminum alloy. The base member 28 has a plurality of openings 30 through which fasteners (not shown) may be inserted to join the post 12 and thus the multi-swivel connector 10 to a power tool 34. The base member 28 also has preferably has a hole 36 drilled therein for receiving part of a means 38 for limiting the range of motion of the swivel member 14. In a preferred embodiment of the present invention, the range of motion limiting means 38 comprises a first pin 40 which may be machined or assembled. For example, the pin 40 may be a structure integrally formed with the base member 38, such as a cast structure. Alternatively, the pin 40 may be separately manufactured and press fit into and/or adhesively secured to the hole 36. The pin 40 is preferably formed from the same material forming the base member 28; however, it may be formed from a different material if desired.

Figure 4:
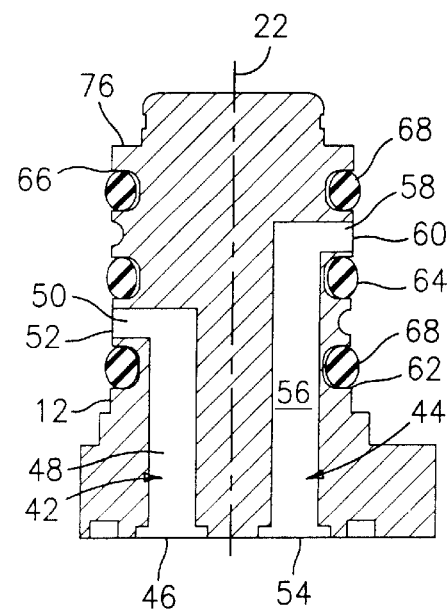
FIG. 4 is a sectional view of the post of FIG. 2 taken along lines 4—4.

As shown in FIG. 4, the post 12 includes two fluid passageways 42 and 44. The fluid passageway 42 has a first fluid port 46, a first leg 48 communicating with the fluid port 46, and a second leg 50 substantially perpendicular to the first leg 48 communicating with the first leg 48 and terminating in a second fluid port 52. The fluid passageway 44 has a fluid port 54, a first leg 56 communicating with the fluid port 54, and a second leg 58 substantially perpendicular to the first leg 56 communicating with the first leg 56 and terminating in a fluid port 60. The first legs 48 and 56 of the fluid passageways 42 and 44 respectively have different lengths so that the fluid port 52 is at a different height than the fluid port 60.

The post 12 also has a series of grooves 62, 64, and 66 positioned above and below the fluid ports 52 and 60. Each of the grooves 62, 64, and 66 receives an O-ring 68 for creating a fluid seal for preventing leakage of fluid. Each of the O-rings 68 may be formed from any suitable compressible material known in the art.

Figure 5:
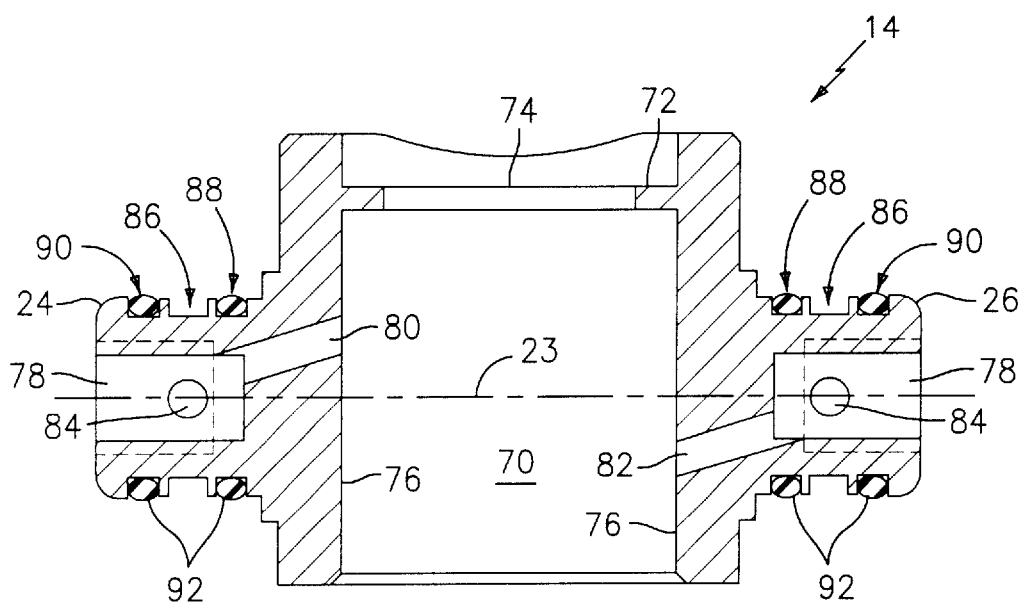
FIG. 5 is a sectional view of a swivel member forming part of the multi-swivel connector of FIG. 1.

Referring now to FIG. 5, the swivel member 14 has a central bore 70 which allows the swivel member 14 to be positioned over the post 12. The bore 70 has a diameter which is substantially equal to the outer diameter of the post elements which form post grooves 62, 64 and 66. The bore 70 also has smooth walls 76 for allowing the swivel member 14 to rotate about the longitudinal axis of the post 12 while maintaining contact with the seals 68.

The swivel member 14 also has an integrally formed shoulder element 72 for positioning the swivel member on the post 12. The shoulder element 72 has a central opening 74 which allows the top portion of the post 12 to pass therethrough and which allows the shoulder element 72 to rest on post shoulder element 76.

A pair of swivel arms 24 and 26 extend outwardly from the swivel member 14 along the axis 23 which extends perpendicular to the longitudinal axis of the post 12. Each of the swivel arms 24 and 26 has a fluid chamber 78 formed therein. When the swivel member 14 is positioned on the post 12, the fluid chamber 78 in the swivel arm 24 communicates with the fluid port 60 via a first fluid line 80 machined in the swivel member 14 and the fluid chamber 78 in the swivel arm 26 communicates with the fluid port 52 via a second fluid line 82 machined in the swivel member 14.

Each of the fluid chambers 78 is provided with a port 84 which communicates with an annular fluid passageway 86 machined into the respective swivel arm 24 or 26. Also machined into each of the swivel arms 24 and 26 are grooves 88 and 90, each of which receives an O-ring 92 for preventing fluid leaks.

Figure 8:
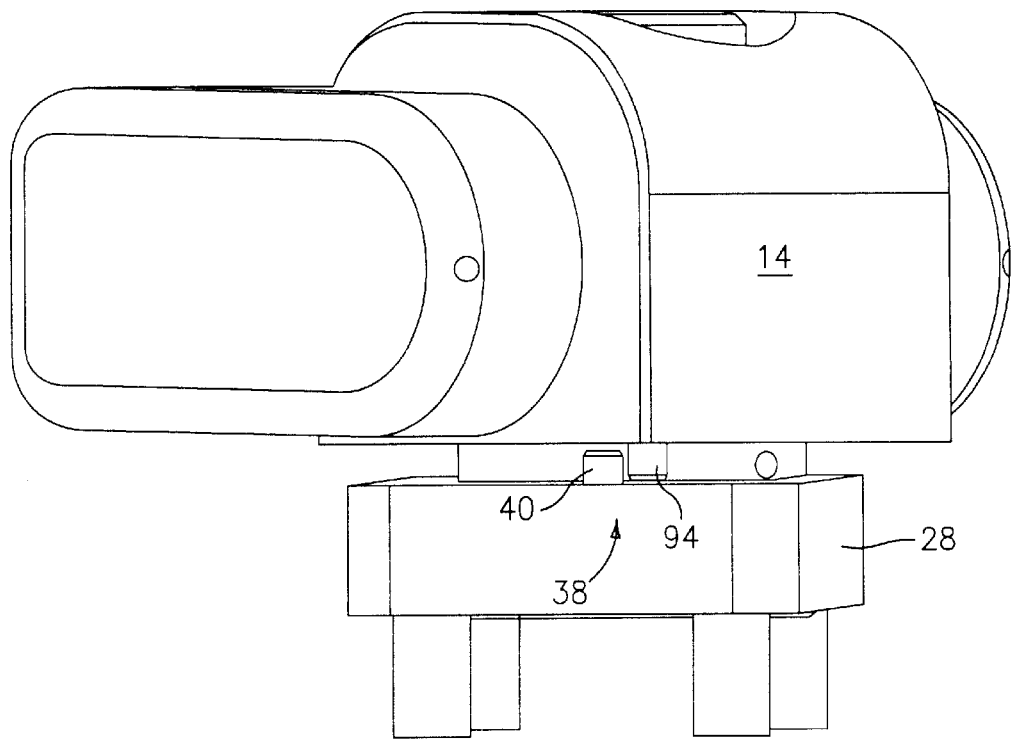
FIG. 8 is a perspective view of the multi-swivel connector of FIG. 1 illustrating the means for limiting the range of motion of the swivel member.

As shown in FIG. 8, a pin 94 is provided on a bottom surface 96 of the swivel member 14. The pin 94 forms part of the range limiting means 38 and cooperates with the pin 40 so that the swivel member 14 can only rotate about the longitudinal axis of the post 12 through a range of motion of less than 360 degrees. As before, the pin 94 may be machined or assembled. The pin 94 may be a structure integrally formed with the swivel member 14, such as a cast structure. Alternatively, the bottom surface 96 may have a hole (not shown) drilled therein and the pin 94 may be press fit into and/or adhesively secured to the hole. The pin 94 may be formed from the same material as swivel member 14 or a different material.

While it is preferred to provide one pin 40 on the base member 28 to cooperate with the pin 94, if desired more than one pin 40 may be provided on the base member 28 to allow for a desired limited range of rotational movement for the swivel member 14, such as a range of rotational movement of less than 350 degrees. Similarly, while only one pin 94 has been shown as being attached to the swivel member 14, more than one pin 94 may be provided if desired to define a limited range of rotational movement for the swivel member 14.

Figure 6:
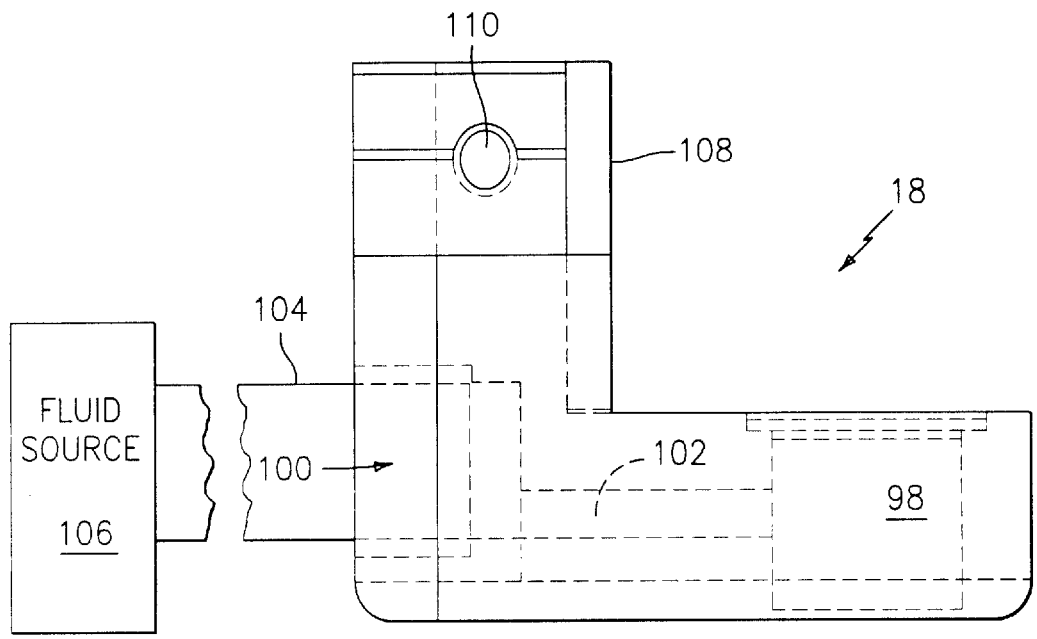
FIG. 6 is a top view of a first member of a fitting means used in the multi-swivel connector of FIG. 1.
Figure 7:
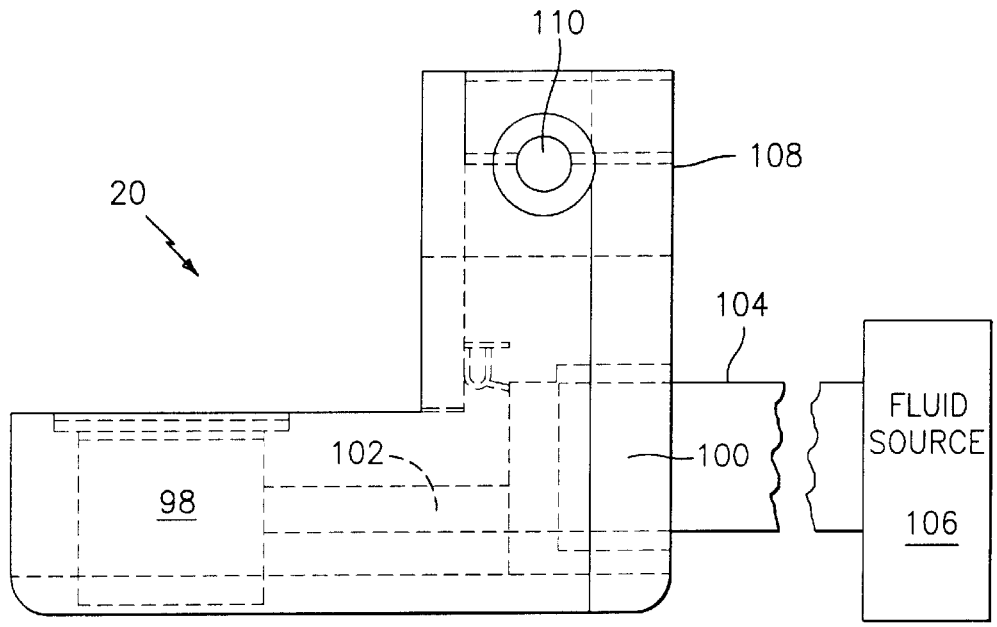
FIG. 7 is a top view of a second member of a fitting means used in the multi-swivel connector of FIG. 1.

Referring now to FIGS. 6 and 7, as previously mentioned, the fitting member 16 is formed by first and second fitting arms 18 and 20. Each of the fitting arms 18 and 20 has a smooth walled bore 98 which allows a respective one of the arms 18 and 20 to fit over a respective one of the swivel arms 24 and 26. The smooth walled bores 98 also allow the fitting arms 18 and 20 and thus the fitting member 16 to tilt relative to the swivel member 14. As previously mentioned, the fitting member 16 may tilt at least 90 degrees about the axis 23 extending perpendicular to the axis 22 of the post 12 and preferably through a range of motion of substantially 180 degrees. Each of the fitting arms 18 and 20 has an external port 100 and an internal fluid passageway 102 communicating with the external port 100. When the respective fitting arm 18 and 20 is positioned over a respective one of the swivel arms 24 and 26, the passageway 102 is in fluid communication with the annular fluid passageway 86.

The external port 100 is preferably threaded to receive an end of a hose 104. The hose 104 may be connected to a fluid source 106 and/or to a return tank (not shown).

Each of the arms 18 and 20 has a portion 108 with an aperture 110 therein. When the arms 18 and 20 are assembled, the portions 108 overlap each other so that the apertures 110 are aligned with each other. Thereafter, a fastener (not shown) is inserted into the aligned apertures 110 to lock the fitting arms 18 and 20 together. If desired, each of the apertures 110 may be threaded to receive a threaded fastener.

Figure 9:
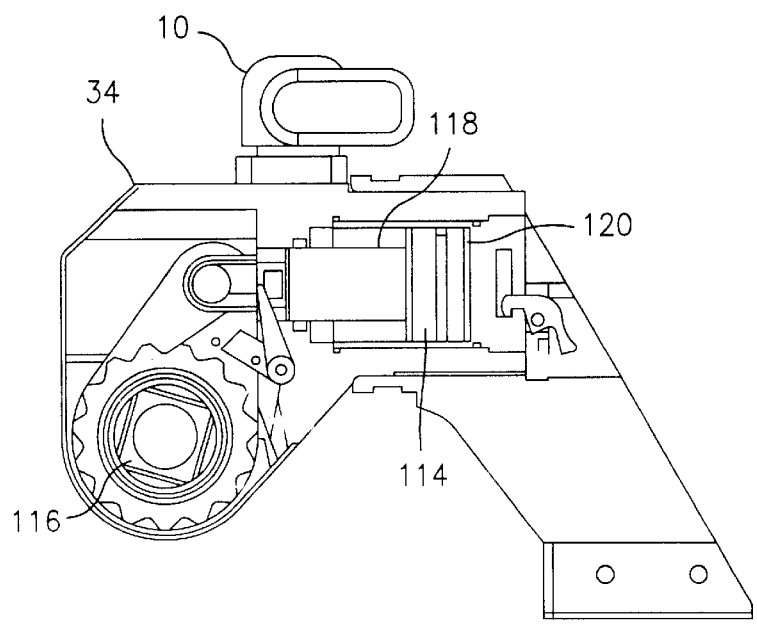
FIG. 9 is a side view of a power tool in partial cross section having the multi-swivel connector of the present invention connected thereto.

Referring now to FIG. 9, the multi-swivel connector 10 of the present invention may be used with a fluid operated power tool 34 having a fluid operated piston 114 for operating an action part 116 for acting on an element such as a threaded connector. The power tool 34 has first and second passageways (not shown) for delivering fluid to and removing fluid from cylinder chambers 118 and 120 on opposite sides of the piston 114. Each of the power tool passageways has a respective port 122 and 124. The multi-swivel connector 10 may be mounted to the power tool 34 so that the fluid port 46 is aligned with the port 122 and the fluid port 54 is aligned with the port 124.

Figure 10:
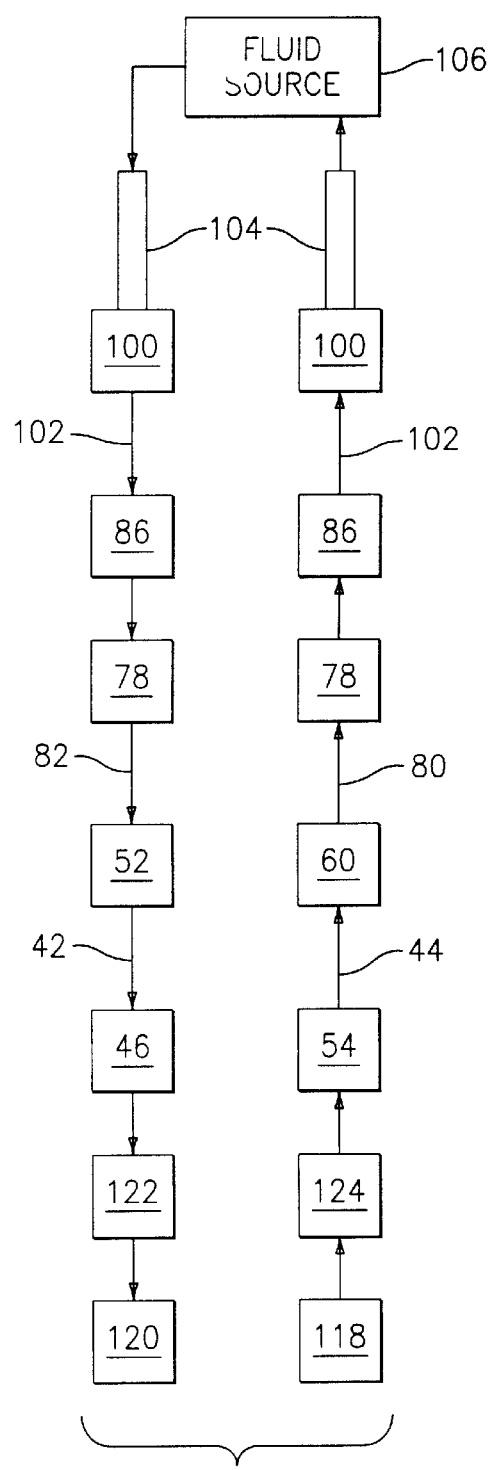
FIG. 10 is a schematic representation of the fluid line connections for operating the drive unit of the power tool in a first operational mode.
Figure 11:
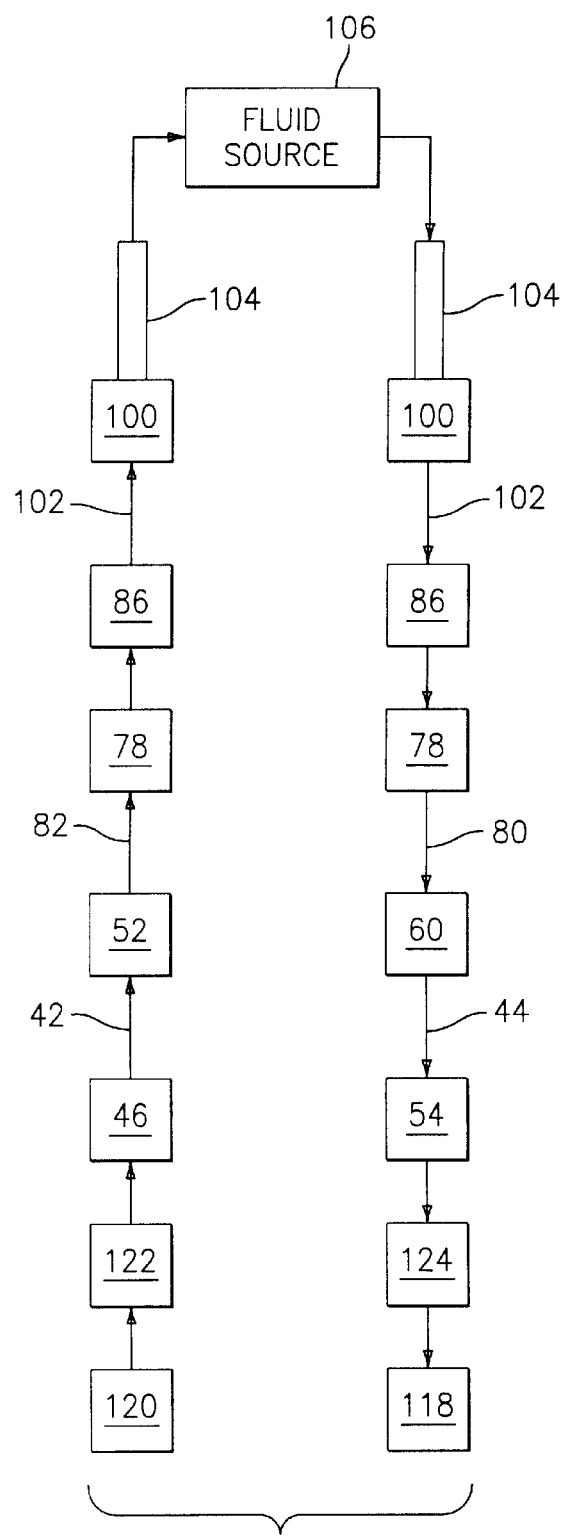
FIG. 11 is a schematic representation of the fluid line connections for operating the drive unit of the power tool in a second operational mode.

In a first mode of operation, as shown in FIG. 10, fluid from the fluid source 106 during one portion of the piston stroke is delivered to the chamber 118 via external port 100 and passageway 102 in the fitting arm 20, annular passageway 86 and fluid chamber 78 in swivel arm 26, fluid line 82 in the swivel member 14, first passageway 42 in the post 12, and port 122. At the same time, fluid is being removed from the cylinder chamber 118 via port 124, fluid passageway 44, fluid line 80 in the swivel member 14, fluid chamber 78 and annular passageway 86 in swivel arm 24, and via fluid passageway 102 and external port 100 in fitting arm 18. During a second portion of the stroke, fluid is delivered to the cylinder chamber 118 via the external port 100 and the fluid passageway 100 in the fitting arm 18, annular fluid passageway 86 and fluid chamber 78 in the swivel arm 24, fluid line 80 in the swivel member 14, fluid passageway 44 and port 124, while fluid is removed from the cylinder chamber 120 via port 122, the fluid passageway 42, the fluid line 82 in the swivel member 14, fluid chamber 78 and annular passageway 86 in the swivel arm 26, and passageway 102 and external port 100 in the fitting arm 20.

As can be seen from the foregoing description, a multi swivel connector 10 has been provided which can be used with a wide variety of fluid operated power tools. The swivel connector 10 avoids safety problems, such as those pinch points which have the potential for hose kinking and injury, by limiting the rotational movement of the swivel member 14 to less than 360 degrees, while permitting movement of the fitting member through at least a 90 degree and preferably a 180 degree range of movement. Using the multi-swivel connector of the present invention, operators can easily attach hoses to the quick connects and make needed repairs. Still further, the multi-swivel connector can be easily stabilized to facilitate repair and connection attachments/changes.

While it is preferred to form the fitting means from two fitting arms that are joined together, the fitting means could be fabricated as a single unitary structure if desired.

While it is preferred to form the rotation limiting means from pins, other types of rotation limiting devices, such as tongue and groove arrangements or thread arrangements, may be used if desired.

It is apparent that there has been provided in accordance with the present invention a multi-swivel connector for a fluid operated tool which fully satisfies the objects, means and advantages set forth hereinbefore. While the present invention has been described in the context of specific embodiments thereof, other alternatives, modifications, and variations will become apparent to those skilled in the art having read the foregoing detailed description. Accordingly, it is intended to embrace those alternatives, modifications, and variations as fall within the broad scope of the appended claims.

What is claimed is:

1. A multi-swivel connector for use with a fluid operated tool comprising:
    a post having an axis;
    swivel means having an axis extending perpendicular to the axis of the post;
    means for limiting rotation of the swivel means to a range of motion less than 360 degrees;
    fitting means attached to said swivel means; and
    said fitting means being tiltable around the axis of the swivel means over a range of at least 90 degrees and being rotatable around the axis of the post.

2. A multi-swivel connector according to claim 1, further comprising means for connecting said post to said fluid operated tool.

3. A multi-swivel connector according to claim 2, wherein said connecting means comprises a base member having a plurality of holes for receiving fasteners for fastening the base member to said fluid operated tool.

4. A multi-swivel connector according to claim 3, wherein said base member is trapezoidally shaped.

5. A multi-swivel connector according to claim 1, further comprising said post having an integrally formed base member and said rotation limiting means comprising at least one pin joined to said base member and at least one pin joined to said swivel means.

6. A multi-swivel connector according to claim 1, wherein said post has first and second internal fluid passageways with said first internal fluid passageway providing fluid to a first port in said fluid operated tool and said second internal fluid passageway receiving fluid from a second port in said fluid operated tool during a first mode of operation and said first internal fluid passageway receiving fluid from said first port and said second internal fluid passageway providing fluid to said second port during a second mode of operation.

7. A multi-swivel connector according to claim 6, further comprising said fitting means having a first external port and a second external port, said first external port being in fluid communication with said first fluid passageway in said post and said second external port being in fluid communication with said second fluid passageway.

8. A multi-swivel connector according to claim 7, wherein said first external port is in communication with said first fluid passageway via a first fluid line in said fitting means, a first fluid chamber in said swivel means, and first fluid line in said swivel means.

9. A multi-swivel connector according to claim 8, wherein said second external port is in communication with said second fluid passageway via a second fluid line in said fitting means, a second fluid chamber in said swivel means, and a second fluid line in said swivel means.

10. A multi-swivel connector according to claim 7, further comprising said first external port being connected to a fluid source by a first flexible fluid conduit.

11. A multi-swivel connector according to claim 10, further comprising said second external port being connected to said fluid source by a second flexible fluid conduit.

12. A multi-swivel connector according to claim 1, wherein said fitting means is tiltable around the axis of the swivel means over a range of 180 degrees.

13. A multi-swivel connector according to claim 1, wherein said fitting means includes two fitting arms which are mounted on said swivel means and which are connected with one another.

14. A multi-swivel connector according to claim 13, further comprising means for connecting said two fitting arms with one another.

15. A multi-swivel connector according to claim 6, wherein each of said first and second internal passageways include a first leg and a second leg extending perpendicular to said first leg.

16. A multi-swivel connector according to claim 6, wherein said first leg of said first passageway has an extent different from the extent of said first leg of said second passageway.

17. A multi-swivel connector according to claim 1, further comprising seal means between said swivel means and said post for preventing fluid leakage.

18. A multi-swivel connector according to claim 1, further comprising seal means between said fitting means and said swivel means for preventing fluid leakage.

19. A fluid operated power tool comprising:
    a fluid operated drive unit;
    a source of fluid for operating said drive unit being connected to said fluid operated drive unit via a multi-swivel connector mounted to said tool;
    said multi-swivel connector comprising a post having an axis, swivel means having an axis extending perpendicular to the axis of the post, and fitting means attached to said swivel means;
    said fitting means being tiltable around the axis of the swivel means over a range of at least 90 degrees and being rotatable around the post; and
    said connector further comprising means for limiting rotation of the swivel means to a range of motion less than 360 degrees.

20. A power tool according to claim 19, wherein said post has a base member and wherein said rotation limiting means comprises at least one pin joined to said base member and at least one pin joined to said swivel member.

21. A power tool according to claim 19, wherein said fitting means is tiltable over a range of 180 degrees.

22. A power tool according to claim 19, wherein said drive unit comprises a fluid actuated piston-cylinder unit.

23. A power tool according to claim 19, wherein said drive unit operates an action part.

* * * * *